(12) United States Patent
Lee et al.

(10) Patent No.: US 12,440,846 B2
(45) Date of Patent: Oct. 14, 2025

(54) RANDOM ACCESS REAL-TIME QUANTITATIVE POLYMERASE CHAIN REACTION (qPCR) REACTOR SYSTEM

(71) Applicant: S.M. RESEARCH INC., Richmond Hill (CA)

(72) Inventors: Hsin-Chin Lee, Mississauga (CA); Kai On Ng, Markham (CA); Frank Wei Zhou, Mississauga (CA); Yuan Min Wu, Scarborough (CA)

(*) Notice: Subject to any disclaimer, the term of this patent is extended or adjusted under 35 U.S.C. 154(b) by 550 days.

(21) Appl. No.: 18/007,628

(22) PCT Filed: May 19, 2020

(86) PCT No.: PCT/CA2020/000062
§ 371 (c)(1),
(2) Date: Dec. 1, 2022

(87) PCT Pub. No.: WO2021/232135
PCT Pub. Date: Nov. 25, 2021

(65) Prior Publication Data
US 2023/0219095 A1 Jul. 13, 2023

(51) Int. Cl.
*B01L 3/00* (2006.01)
*B01L 7/00* (2006.01)
*G01N 21/64* (2006.01)

(52) U.S. Cl.
CPC ............ *B01L 3/50851* (2013.01); *B01L 7/52* (2013.01); *G01N 21/6428* (2013.01); *G01N 21/6452* (2013.01); *G01N 21/6456* (2013.01); *B01L 2200/028* (2013.01); *B01L 2300/0654* (2013.01); *B01L 2300/12* (2013.01); *B01L 2300/18* (2013.01); *G01N 2021/6439* (2013.01); *G01N 2201/0636* (2013.01); *G01N 2201/08* (2013.01)

(58) Field of Classification Search
CPC .. B01L 3/50821; B01L 7/52; B01L 2200/028; B01L 2300/0654; B01L 2300/0829; B01L 2300/12; B01L 2300/18; C12Q 1/686; G01N 21/6428; G01N 21/6452; G01N 21/6456; G01N 2021/6439; G01N 2201/0636; G01N 2201/08; G02B 6/0016; G02B 6/0038
See application file for complete search history.

(56) References Cited

FOREIGN PATENT DOCUMENTS

| WO | WO-2010079338 A2 | * | 7/2010 | .......... B01J 19/0046 |
|----|------------------|---|--------|------------------------|
| WO | WO-2013049709 A1 | * | 4/2013 | .......... G01N 21/6452 |

* cited by examiner

*Primary Examiner* — Michael L Hobbs
(74) *Attorney, Agent, or Firm* — Nasser Ashgriz; UIPatent Inc.

(57) ABSTRACT

The present random access PCR reactor for biological analysis, comprises of a number of PCR reactors held on a platform, and one optical system to be shared by all of the PCR reactors on the platform. The optical system is held on a traverse mechanism to move it over any one of the PCR reactors that are ready to be imaged. Other PCR reactors on the platform can be accesses and replaced. The optical system has a lightpipe and a lightguide that distributes a uniform light over all the samples held on the reactor. The lightguide of the present optical system has a set of light reflecting structures that are strategically located to uniformly reflect an incoming light towards all the samples held in the PCR reactor that is being tested.

20 Claims, 14 Drawing Sheets

RANDOM ACCESS REAL-TIME QUANTITATIVE POLYMERASE CHAIN REACTION (qPCR) REACTOR SYSTEM

FIELD OF THE INVENTION

The present invention relates generally to light-based detection systems, such as an automated system for quantitative real-time polymerase chain reaction (hereinafter qPCR), digital PCR instruments, DNA sequencing instruments, and antigen-antibody ELISA instruments, and in particular, to the illumination system for these instruments.

BACKGROUND OF THE INVENTION

Polymerase chain reaction (PCR) is an in vitro quantification of nucleic acids. PCR is routinely practiced in medical and biological research laboratories for a variety of tasks, such as the detection of hereditary diseases, the identification of genetic fingerprints, the diagnosis of infectious diseases, the cloning of genes, paternity testing, and DNA computing. The method has been automated through the use of thermal stable DNA polymerases and machines capable of heating and cooling genetic samples rapidly, commonly known as thermal cyclers.

In a typical PCR experiment, the DNA of interest is separated into two strands and synthesised using a primer, doubling the amount of DNA. The process is repeated until a large number of DNA segments are synthesized. This simple gene amplification technique allows the DNA to amplify quickly. In PCR technology an extremely small amount of target DNA can be amplified a million times in short time, thus greatly improving the ability to detect and analyze DNA molecules.

In order to advance the PCR process, a particular temperature change has to be applied on the DNA containing solution to result in separation (melting), primer binding (annealing), and replication (extension). Separation occurs at high temperatures, such as 95° C., annealing occurs at low temperatures, such as 60° C. However, this process is very sensitive to the sample size and can cause large differences in the final amplification. The PCR reaction comprises of an early lag phase, an exponential growth phase and a plateau region. The sensitivity of the instrument mainly appears in the lag phase. The exponential growth phase commences when sufficient amount of product has accumulated to be detected by a specific instrument. In the final plateau phase, the amplification efficiency drops as product competes more effectively with primers for annealing and the amount of enzyme becomes limiting. Most of the quantitative information is found in the exponential cycles, but the exponential cycles typically comprise of only 4 or 5 cycles out of 40.

An optical detection system is generally used for interrogating the reactions in the PCR, which measures the intensity of the fluorescence emission from each of the sample tubes in the reactor. To measure fluorescence, an excitation light is directed at the samples in the sample vessels, and light emitted from the fluorophores in the samples is detected. It is often desirable that the transfer of light from the light source to the wells be carried out effectively and efficiently. Thermocycling and fluorescence monitoring at each cycle for quantitative PCR is carried out using standard techniques known to those skilled in the art, including rapid cycling PCR. For traditional PCR methods, identifying the exponential cycles requires that the reaction be split into multiple reaction tubes that are assayed for PCR product after varying numbers of cycles. Optical systems for directing light to sample plates is known, for example, as described in U.S. Pat. Nos. 6,942,837, 7,369,227, 6,852,986, and 7,410,793. While optical systems for directing light to sample vessels in plates and detecting light from the sample vessels have been developed in the art. However, there remains a need for optical systems that more effectively distributes light to and receive light from the sample vessels.

Real-time quantitative PCR (qPCR) technique is a method of quantifying the fluorescence in a fluorescent labeled probe based on the conventional PCR or real-time monitoring of the respective fluorescent dyes in the entire PCR process, and quantitative analysis of the final standard curve of known templates.

There are also other methods, such as Digital PCR (dPCR), which partitions one PCR reaction into many small individual PCR reactions such that each small reaction on average contains no more than one target nucleic acid molecule. Each small reaction approximately contains either 1 or 0 target nucleic acid molecule and gives a positive or negative binary readout at the end of PCR amplification. The absolute amount of the target gene are determined by counting the actual target molecules, which does not depend on the exponential amplification cycle number and comparison to a reference gene for quantification of the initial amount. By using massive amount of partitions, dPCR can be used to detect finer fold-differences than that of qPCR.

In general, qPCR instruments are real-time PCR detection with 2 main functional modules: Temperature control system and fluorescence detection/monitoring system. Such instruments mainly compose of the sample stage, gene amplification thermal cycling components, fluorescence detecting optical system and the micro-circuit control system. Wherein the gene amplification thermocycling assembly are substantially similar in all. A fluorescence detection system comprises of fluorescence excitation, an emission, an optical system, a fluorescence detection means, and a control system. Commonly used fluorescent excitation light sources are halogen lamps, laser or LEDs. The fluorescence detection is usually achieved by a photomultiplier tube, a cooling CCD/CMOS camera or a photodiode.

qPCR is currently one of the more commonly used systems, however, there are several issues with the current systems. One is to obtain a thermal uniformity across an array of samples to be tested that are held in a microchips. Most PCR reactions are carried out in a multi well microchip, in order for a large number of samples to be used at once. If the spacings between each well is large, then it is more difficult to have a temperature uniformity in all wells for a multi-well microchip and even more difficult for a large array microchips in one PCR thermal cycler. In order to eliminate this issue the wells have to be made closer to each other to fit more wells and samples in a smaller area. Many of the current PCR reactors use the bottom side of the wells for detection. This design, does not allow the wells to be made closer to each other, and therefore, resulting in poor thermal uniformity among all wells. In order to be able to make the wells as close as possible, the detection has to be made from the top side of the microchips, since the bottom side sits on the thermal cycler. Some systems use porous semiconductor microchips, however, such systems are difficult to operate and are costly. In addition, heating and cooling of the porous semiconductor substrate results in uneven distribution of power and energy, and an uneven and slow heating and cooling.

qPCR instrument according to the type of detector used may be classified as a point detector (e.g., a photomultiplier tube or avalanche diode) and the two-dimensional plane array detector (CCD camera or CMOS). Two-dimensional scanning using a probe is slow, but it has good performance parameters, such as high signal to noise ratio, and a large dynamic range. Usually a two-dimensional array detector without scanning is used, which has a high detection speed but relatively poor performance.

Current PCR instruments mainly have two formats: (i) 96 or more holes in which multiple sample slots share a single temperature control unit and fixed optical excitation detecting system. In this case, sample slots have to be filled up before the start. This limits the application and turnaround time. (ii) Another format is a single hole modularization PCR instrument, in which each sample slot has an independent temperature control unit and an optical excitation detecting system. This system has a great flexibility. However, the manufacturing cost of the single sample slot format is high and sample throughput expansion capacity is limited.

The present invention aims to design a new format of modularized qPCR system in which sample testing is randomly accessible, which substantially increase the system throughput. This system uses a special type of illumination and light detection system. The present high performance and moveable optical detection unit, provides a qPCR system that only requires one optical unit to achieve scanning and monitoring of up to 10 or more thermal cycler modules simultaneously. Therefore, it significantly reduces manufacturing cost.

SUMMARY OF THE INVENTION

The present invention is an automated random access real-time qPCR. It comprises of multiple PCR reactors, each having its own temperature control system but sharing one optical system for detection. This system can perform multiple qPCR reactors at short intervals from each other since it has a single optical system that is rapidly moved over a series of PCR reactors.

The present random access PCR reactor for biological analysis, comprises of a number of PCR reactors held on a platform. Each PCR reactor has a number of microchips, each microchip having an array of wells to hold to hold biological samples. The present random access PCR reactor has one optical system to be shared by all of the PCR reactors on the platform. The optical system has an illumination system and an imaging system. The illumination system comprises of (i) a light source with a set of lenses and filters; (ii) a lightpipe, and (iii) a lightguide. The lightpipe comprises of an array of light pipes that receive the light from the light source and uniformly distribute it into the lightguide. The lightguide is configured to be located on top of one of the PCR reactors on the platform such that it can illuminate all sample containing wells of all microchips on that PCR reactor. The lightpipe and the lightguide are configured like an L-shape, where the lightguide forms the horizontal leg, having a clear space above it. An imaging system is position above the lightguide, in the clear space, to take images of the florescent light emitted by the illuminated samples in the wells of that reactor. The lightguide is designed to have a uniform light distribution to all of the wells in the reactor that is being tested. Uniform light distribution is a critical parameter to perform an accurate sample analysis. The lightguide has an array of light reflecting structures to reflect part of each light ray into each biological sample in each sample holder, wherein all of the plurality of biological samples are illuminated simultaneously to cause emission of the plurality of emitted light.

The optical system is held on a traverse system, which can move and hold the optical system above anyone of the PCR reactors on the platform. A computer system coordinates the thermal cycle timing of each reactor, the movement of the optical system by the traverse system, and the imaging of the emitted lights. While the optical system is operating on a particular PCR reactor, other PCR reactors can be replaced with a new PCR reactor with new samples, therefore, providing a random access PCR reactor.

The present random access PCR comprises of a plurality of PCR reactors, each comprising of an array microchip blocks that are thermally coupled to a temperature control element, wherein the thermal cycle of each PCR reactor is independently controlled by its respective temperature control element. In one embodiment of the present invention, the PCR reactors are aligned linearly. However, any other alignments, such as an array of rows and columns, is also possible. The optical unit is set of a motorizes travers (rack) to move it over the PCR reactors at different times to take images of the light emitting from the microchips on that PCR. The optical system can be moved from one PCR reactor to another, and exciting and recording fluorescence from the microchip blocks on each reactor, simultaneously. A computer processor controls the temperature of each PCR reactor and the movement of the optical system.

The optical system of the present device is so designed to provide a uniform light across all arrays microchips on each PCR reactor. It is built in a compact form to be able to easily move it with high precision. It uses a light source, such an LED or a halogen lamp, shined through an optical system over the entire PCR reactor. A camera positioned above the sampling area records fluorescence excited from samples.

BRIEF DESCRIPTION OF THE DRAWINGS

Embodiments herein will hereinafter be described in conjunction with the appended drawings provided to illustrate and not to limit the scope of the claims, wherein like designations denote like elements, and in which:

DETAILED DESCRIPTION OF PREFERRED EMBODIMENTS

Figure 1:
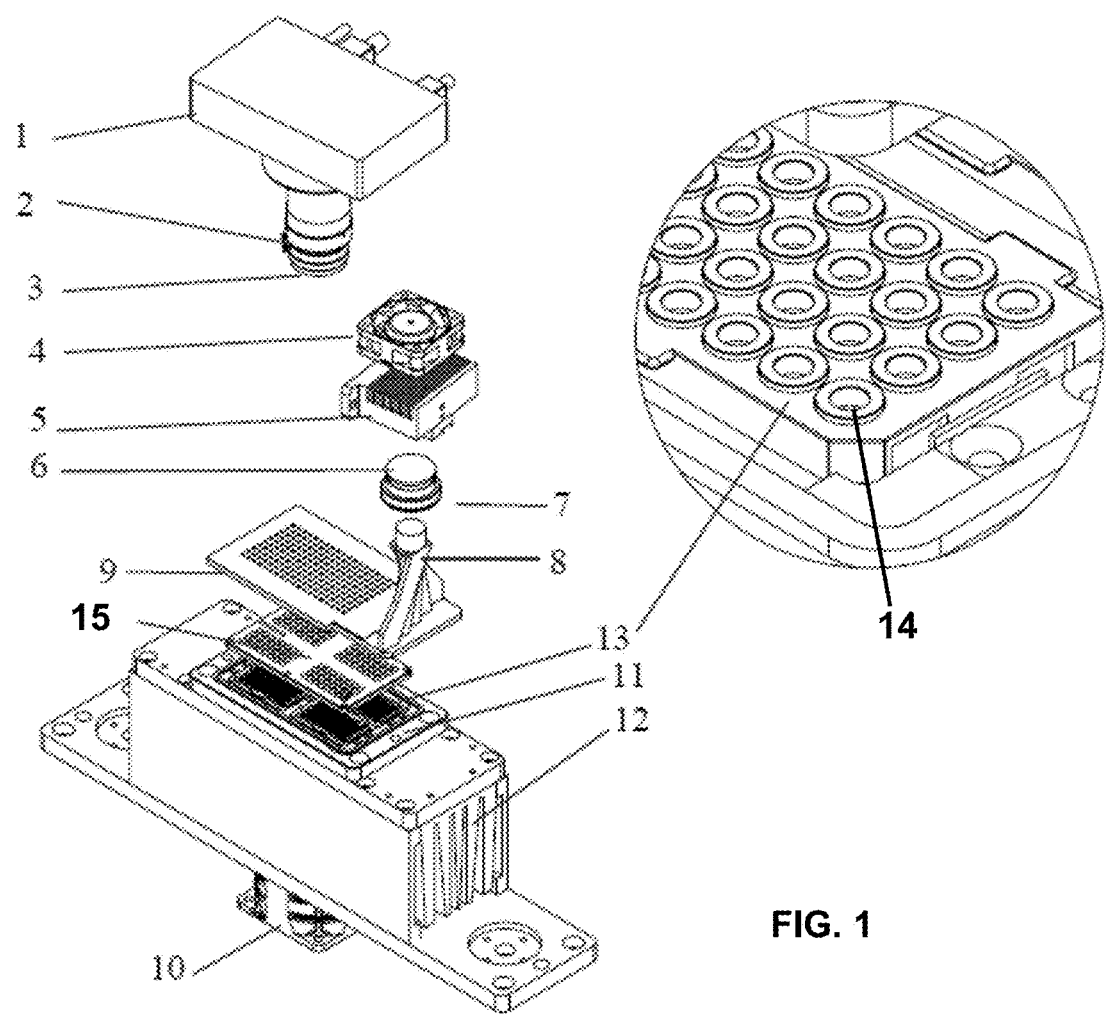
FIG. 1 shows the optical system of the present invention together with a microchip set on top of a temperature control heater.

FIG. 1 shows one embodiment of the present PCR reactor using a single temperature control unit and holding four microchips. The system comprises of a CCD camera 1, a lens for the camera 2, a camera filter wheel 3 having filters, a light cooling fan 4 for the LED, an LED module 5, a lens 6, a source light filter 7, a lightpipe 8, a lightguide 9, a radiator cooling fan 10, a thermal module 11, a radiator 12, several microchips, 13, each microchip having an array of sample holder or wells 14 to hold biological samples, and a heat lid 15.

Figure 2:
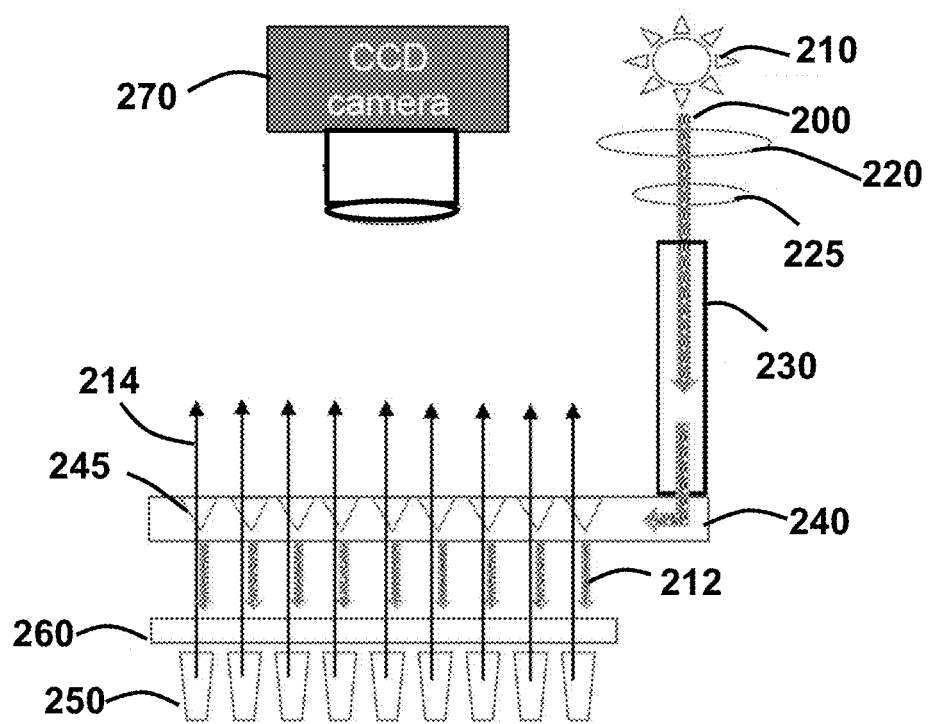
FIG. 2 shows the lighting system of the present invention applied on the wells of microchip.

FIG. 2 shows the operation of the present light system. Light ray 200 from an LED source 210 (or any other light source) is passed through a filter system 220, and a lens system 225. The light ray then enters a lightpipe 230 that comprises of a number of lightpipes. The array of lightpipes divide the light into a number of separate light rays. The light then enters into a lightguide 240, and it is turned horizontally along the direction of the microchips that have the sample holding wells 250. The light rays going through the lightguide 240 progressively are reflected downward 212 towards the wells 250. The lightguide 240 has structures 245 to allow some of the light to go through and some become reflected towards the wells. Once the light 212 enters the sample holding wells 250, the luminescent material in the sample absorbs the excitation light, and in response, generates and emits luminescent light by spontaneous emission. The fluorescent light emitted from the wells 214 goes through the light guide 240 after passing through a heat lid 260. The emitted light is picked up by the camera system 270 located above the chip. Each well is individually excited and emitted light is recorded by the camera. The camera can be a charge coupled device (CCD) detector array, a complementary metal-oxide-semiconductor (CMOS) detector array, or a photomultiplier detector. The camera sensitivity should be high to captures the emitted lights. Different camera resolutions, such as a 4 megapixels camera, can be used. The source light filter 7 passes wavelengths of light in a specific bandwidth, removing the wavelengths of light that are the same as those of the fluorescent dye emission lights. Generally, the wavelengths of light passing through the source light filter is shorter than the wavelengths of light passing through the camera filter wheel. The fluorescent lights emitted from the fluorescent dyes pass through the filter wheel, and are received by the digital camera. The optics are preferably designed to reflects short wavelength excitation lights and transmits long wavelength emission lights. Any other combination is possible. The filter wheel is used to switch between different emission filters to selectively prioritize the wavelengths of light coming from fluorescent dyes of interest. Using the detection unit, real-time full field images of each microchip are captured during the process of PCR.

Figure 3:
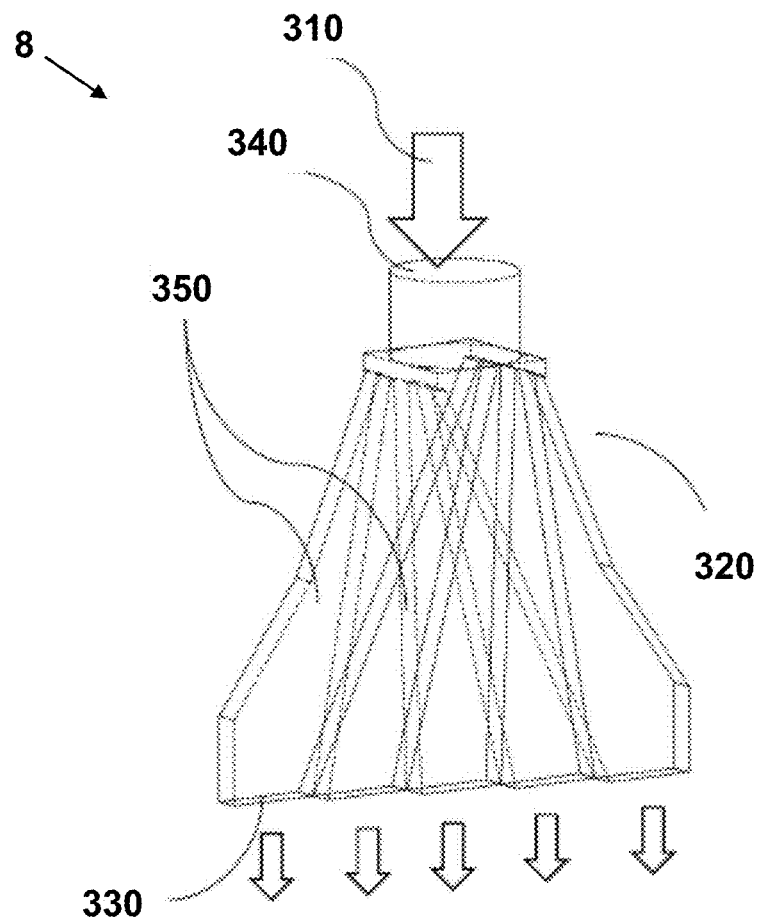
FIG. 3 shows a lightpipe of the present invention.

FIG. 3 shows the lightpipe 8, which transmits the light 310 from LED module 5 into the lightguide 9. The lightpipe comprises of several transparent material 320 that are set on each other with a certain overlap. The shape and the angle of each lightpipe is designed to guide the light towards the lightguide 9 with low loss, and manage the light output percentage and angle on each exit surface 330 to control uniformity and other illumination requirements. The lightpipe 8 comprises of an entrance 340 and several exit surfaces 330 with side surfaces having predefined angles 350. The lightpipe can be moulded into a single piece, or it can be made of several pieces combined together to divide the light. The transparent material can be optical glass, PMMA, poly(acrylic acid), polycarbonate, polyethylene or other optically transparent materials. The number of light transparent pieces depends on the sizes and the number of the microchips that are held on each PCR reactor and need to be illuminated. There are preferably 1-10 glass pieces and more for larger systems. The system can be modified to have different number of entrance and exit surfaces.

Figure 4A:
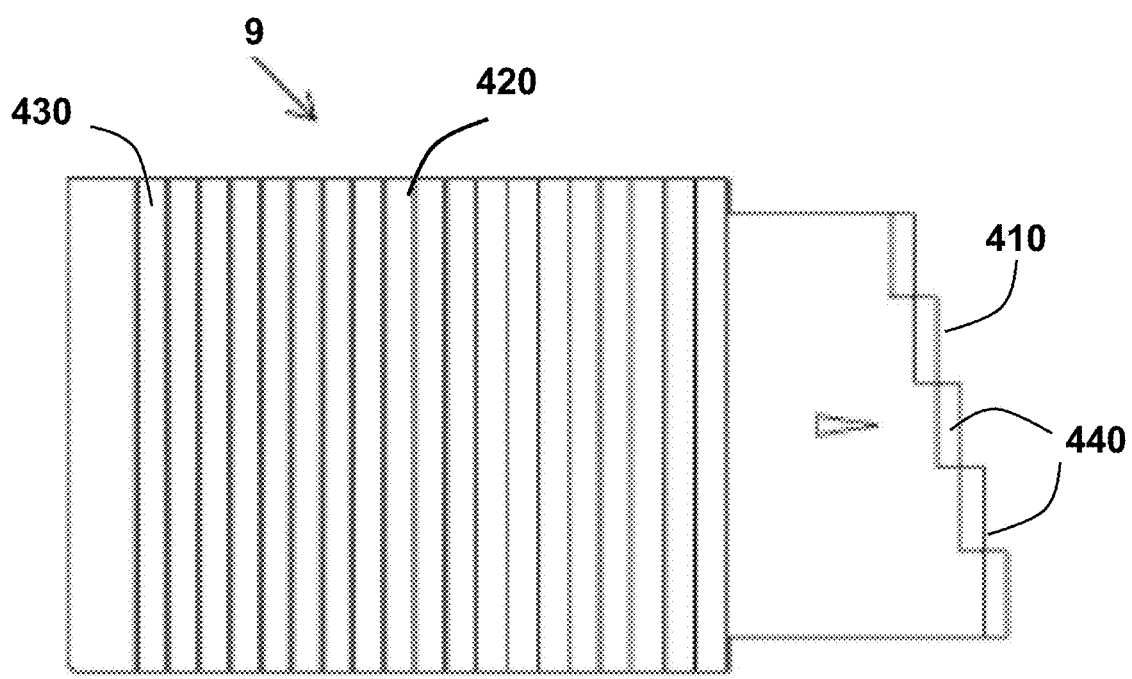
FIG. 4A shows the top view of a first embodiment of a lightguide of the present invention.

The lightpipe 8 is attached to a lightguide 9 shown in FIG. 4A. The lightpipe and lightguide form a L-shaped configuration, such that light enters the lightguide from one side, leaving an open space above the lightguide, where a camera is located. The lightguide is substantially flat structure with a length and a width. The lightguide has three major features: (i) light coupling or entrance features 410, (ii) optical features or structures for uniformity and efficiency 420, and (iii) reflective surfaces 430. The entrance features are configured to receive light from each of the lightpipe sections with minimum loss. The light that arrives at substantially vertical direction is changed to substantially horizontal direction. The lightguide directs and diffuses light. The surfaces of the lightguide are such that they guide light through the lightguide by reflection from the top and bottom surfaces of the light guide. The lightguide conducts lights across the entire sample area and has special features and structures to illuminate each of the sample tubes. In one embodiment of the present lightguide, the entrance feature are configured in the form of multiple steps 440 that are sized to match the exit surface 330 of the lightpipe. The lightguide can be moulded or made by any light transparent materials. It conducts lights across entire sample area to be illuminated.

Figure 4B:
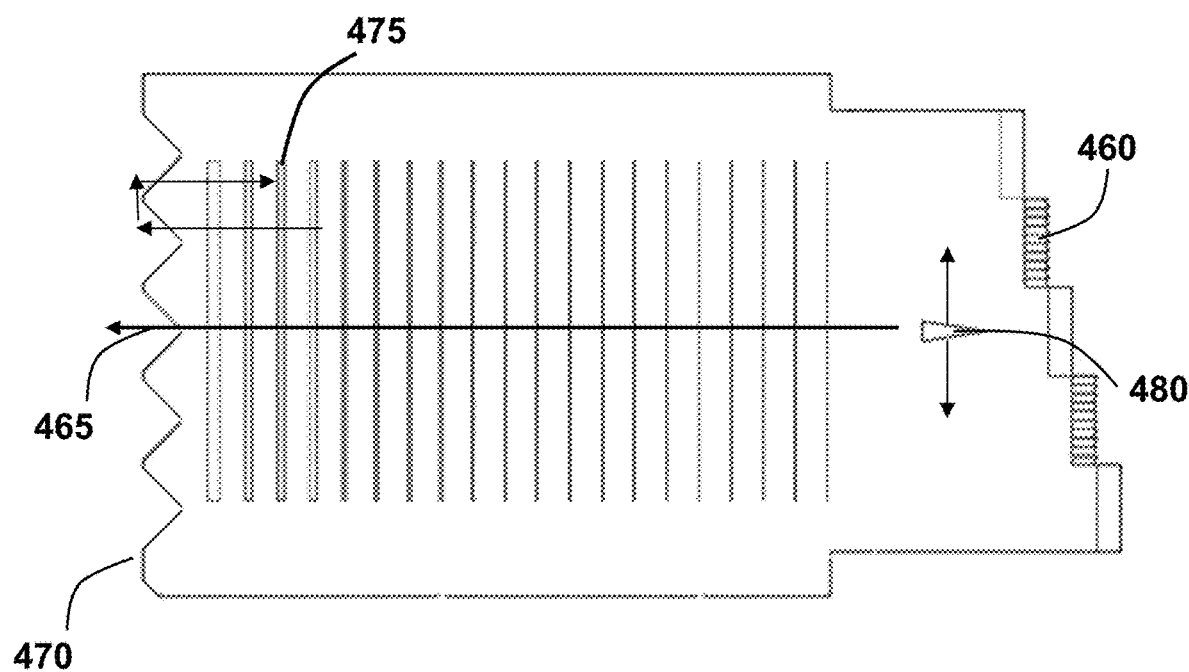
FIG. 4B shows the top view of a second embodiment of a lightguide of the present invention, where the arrows show the direction of a light path.

FIG. 4B show another embodiment of the entrance structure of the light guide, in which the light guide has structures 460 at the entrance section of the light guide 410 to columate the light along the longitudinal axis 465 of the light guide and in the parallel direction of the surface of the microchip. The lightguide may have surface coating in all surface. The far end 470 of the lightguide in FIG. 4B has triangular structures to reflect the light back into the light guide, preventing the loss of light and generating a more uniform and diffused light source for the PCR. The light guide also has an array of notches 420 in FIGS. 4A and 475 in FIG. 4B in perpendicular direction to the longitudinal axis 465 reflect the light downward or upwards. The lightguide also has a triangular aperture 480 in the lightguide along the longitudinal axis to diffuse the light the light towards the sides of the lightguide, which results in a more uniform light distribution with minimum loss in the lightguide.

Figure 5:
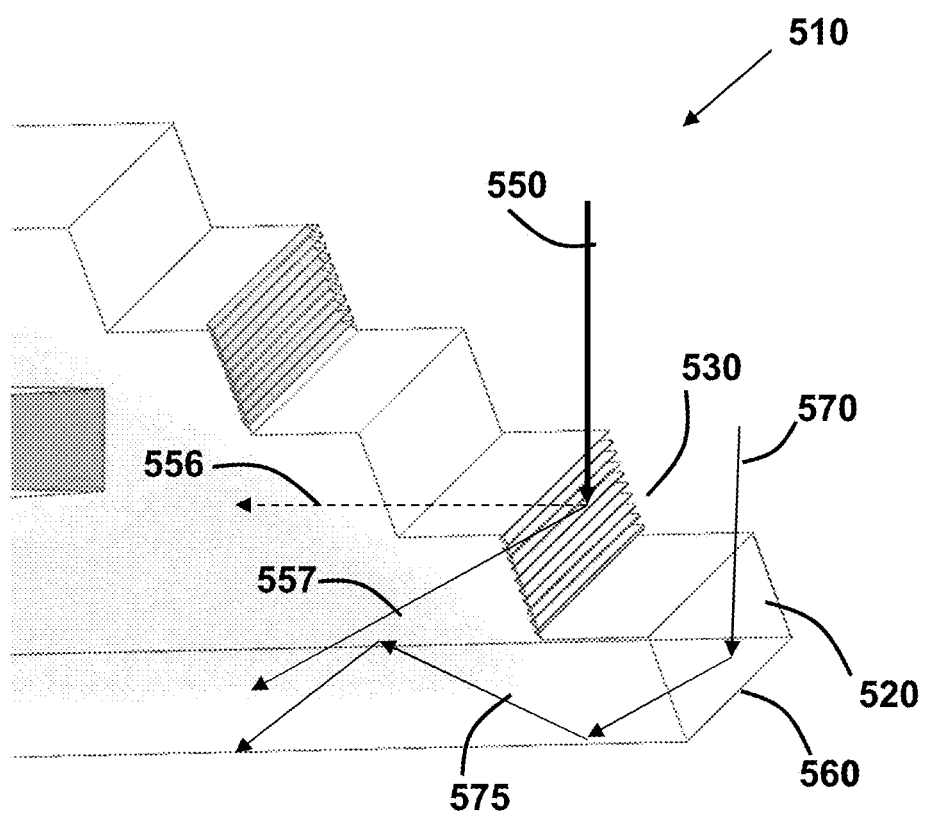
FIG. 5 shows a cross section of an embodiment of a lightguide with parallel internal structures.

FIG. 5 shows another embodiment of the entrance structure of the lightguide 510 with one step being polished flat and another step having structures to columnate the light. The entrance surface 520 is optically polished or has OCA (optical contact angle) to fill in the gap in between the lightpipe exit surface and the lightguide entrance surface.

The features on the surface 530 are configured to direct a light ray 550 arriving at the surface 530 to predefined directions, for example in 556 and 557 directions.

The surfaces of the lightguide are reflective 560, either by the material characteristics of by a reflective coatings/material for TIR (total internal reflection). For example a light ray 570 arriving at the reflective surface 560 bounces off the reflective surface and travels in the direction of the light guide 575.

Figure 6A:
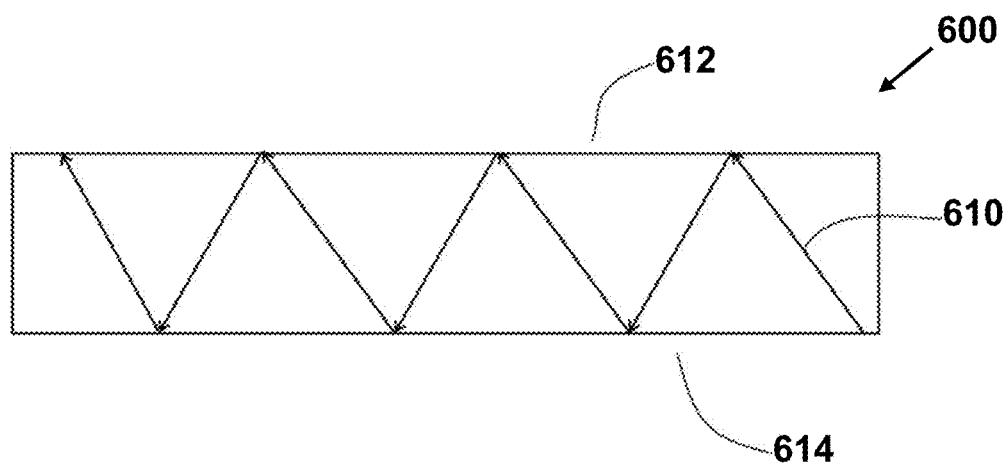
FIG. 6A shows the light path in a lightguide without any internal reflective features.

FIG. 6A shows a side view 600 of a simple light guide that has no reflective structures. A light ray 610 reflects from the top surface 612 and the bottom surface 614 because of the material properties by a reflective coatings/material for TIR (total internal reflection). In the preferred embodiment, the lightguide has reflective structures of the lightguide may have different internal structures to reflect the light towards the wells of the microchip. This light guide distributes a uniform light over the entire PCR reactor that is being tested.

Figure 6B:
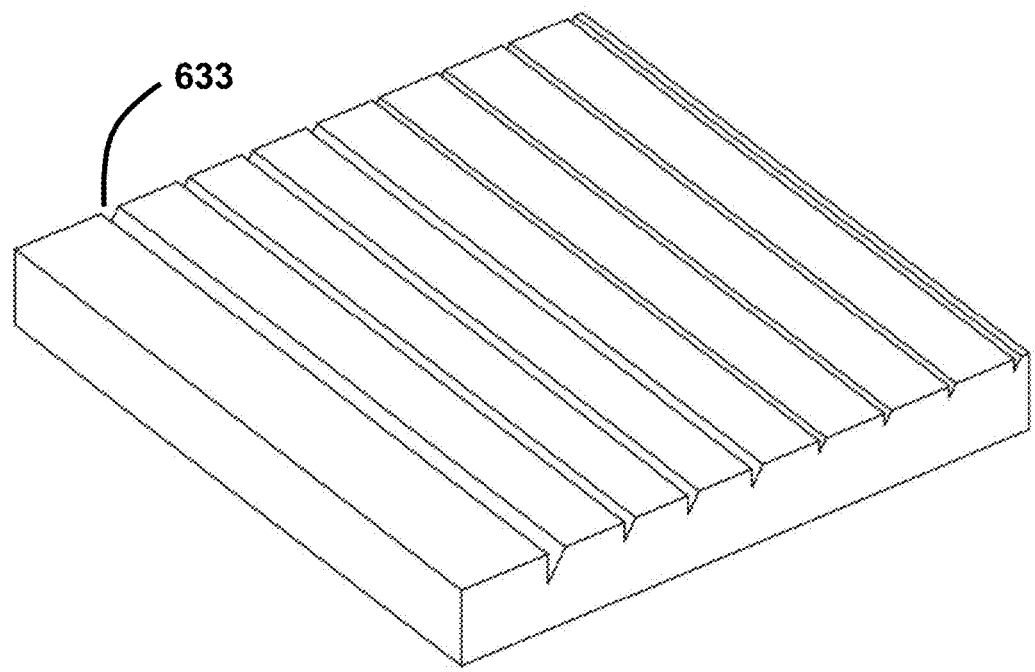
FIG. 6B shows a perspective view of a lightguide with internal structures on the top surface.
Figure 6C:
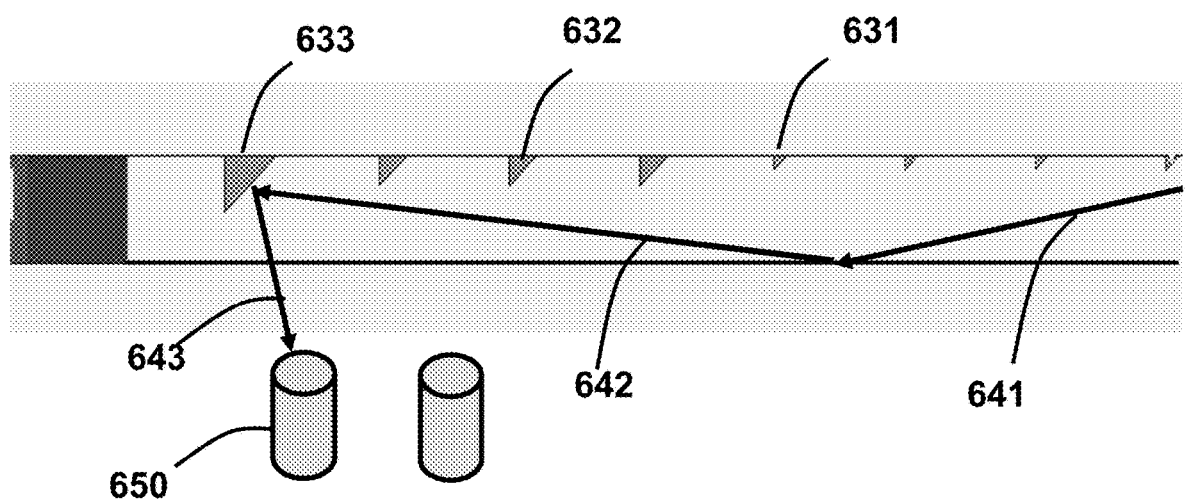
FIG. 6C shows the side view of a lightguide with the internal structure on the top surface and showing a light path reflecting into a well.

FIGS. 6B and 6C show a perspective and a side view of a lightguide with reflective structures on the top surface of the lightguide. In the preferred embodiment, the reflective structures are a set of parallel notches made along the width of the lightguide that are substantially perpendicular to the longitudinal axis of the lightguide. In one embodiment, the notches have a triangular cross section with a predefined heights and angles. However, the reflective structures, 631-633, can have different shapes such as triangle/rectangle/circle. The angles and shapes are based on the incident light angle and the direction that the reflected lights should go. The angles can be in the range of 10 to 90 degrees. The reflective structures (optical features) are strategically located to reflect light onto a chip. The features are not only designed to provide uniform light distribution but also improve total efficiency of light usage. The structures and the notches on the light guide may be made by laser etching, injection moulding, embossing, or the like. FIG. 6C shows an example of a light ray 641 that is reflected off the bottom surface in the direction 642 and then reflected off the structure 633 in direction 643 towards a well 650.

Figure 6D:
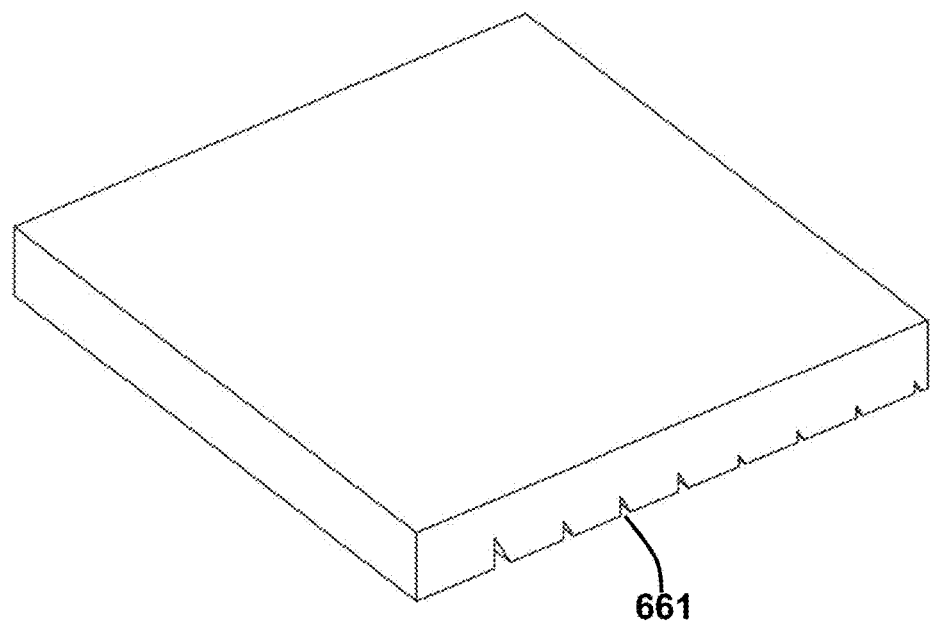
FIG. 6D shows the perspective view of a lightguide with the internal structure on the bottom surface.
Figure 6E:
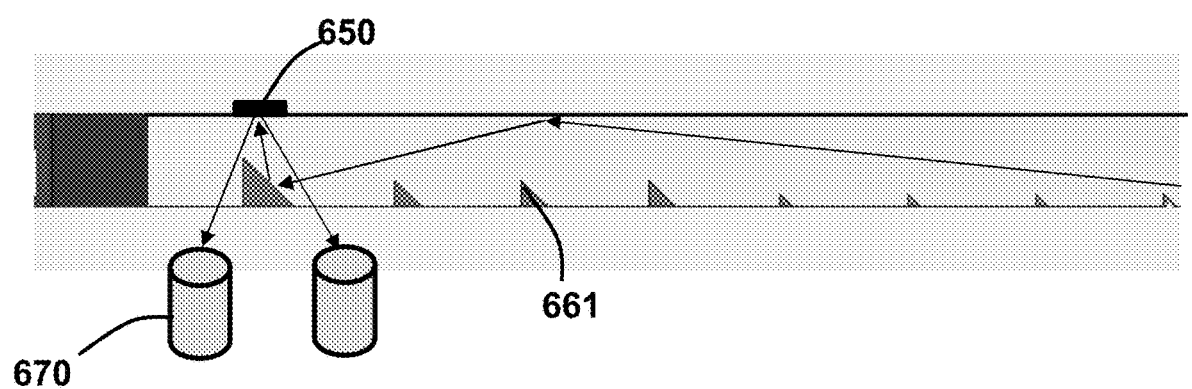
FIG. 6E shows side view of a lightguide with the internal structure on the bottom surface and showing a light path reflecting into a well.
Figure 7A:
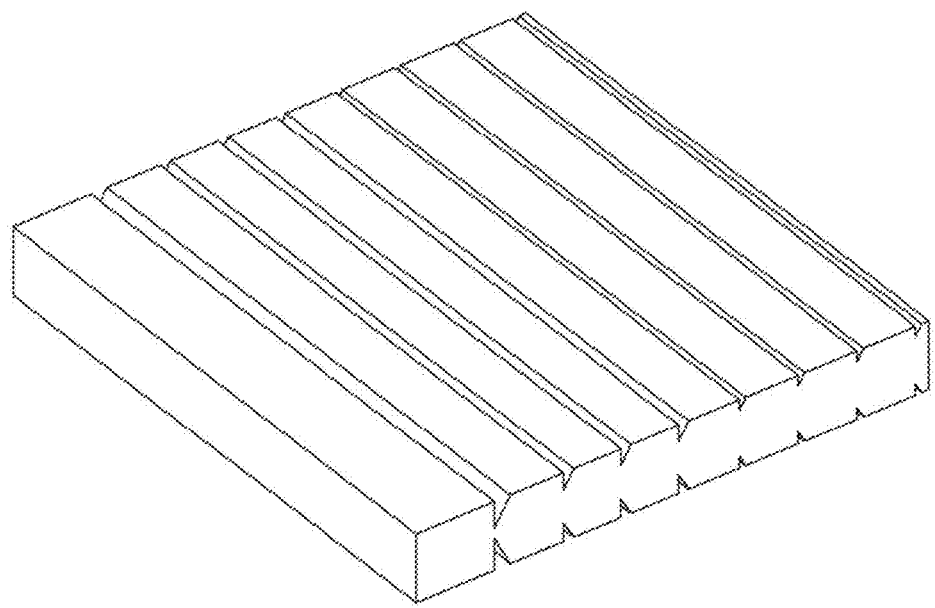
FIG. 7A shows the perspective view of a lightguide with the internal structure on both the top and the bottom surfaces and showing a light path reflecting into a well.
Figure 7B:
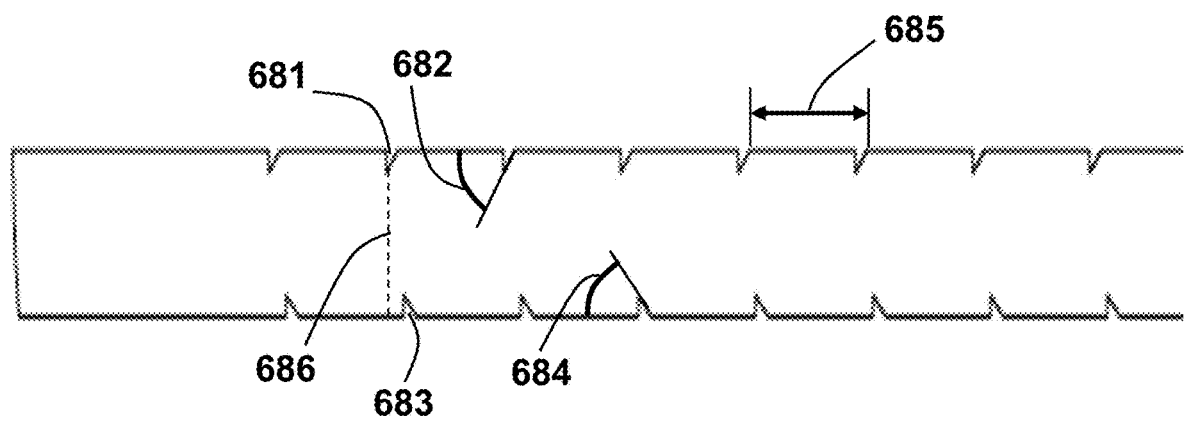
FIG. 7B shows the side view of a lightguide with internal structures on both the top and bottom surfaces.

FIGS. 6D and 6E show another embodiment of the lightguide wherein the structures 661 are on the bottom surface of the lightguide. The light ray reflects from the lower structures and then reflects off the light reflecting surface 665 on the top surface towards the well 670. FIGS. 7A and 7B show another embodiment of a lightguide with reflective structures (notches) on both the top and the bottom surfaces. In the preferred embodiment, the structures on the top surface 681 are right triangles with 45-degree angle 682, where their hypotenuses is towards the incoming light source (towards the right side). The bottom triangles 683 have a 41-degree angle 684 at the bottom surface and their hypotenuses are towards the incoming light source (towards the right side).

The number of and the spacing 685 between the reflective structures are the same as those for the rows of the wells on each PCR reactor. For example if the spacing 685 between the rows of the wells is 4 mm, the reflective structures will be 4 mm apart. In order to have a uniform light distribution, the height of the triangles (the depth of the notches) progressively increases along the lightguide. In one embodiment that the lightguide has 20 notches, starting from the entrance side, there are 4 notches with 0.06 mm height, 4 notches with 0.08 mm height, 4 notches with 0.18 mm height, and 8 notches with 0.4 mm height. The reflective structures help to improve the light uniformity for the end side of the lightguide. Therefore, there are less notches at the bottom surface than the top surface. In one embodiment, for the lightguide that has 20 notches on the top surface, the bottom surface has 9 notches with 0.4 mm height. The notches on the bottom surface are offset 686 with respect to the top surface to prevent the blockage of the emitted lights form the wells below them.

Figure 8:
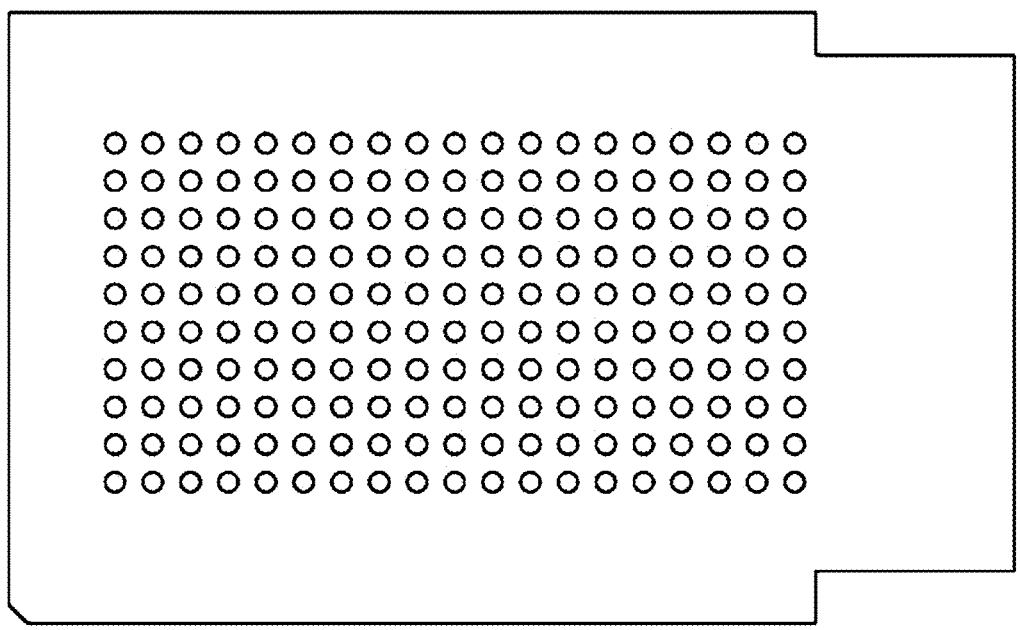
FIG. 8 is top view of a heat lid with preformation to match the wells of the microchip.
Figure 9A:
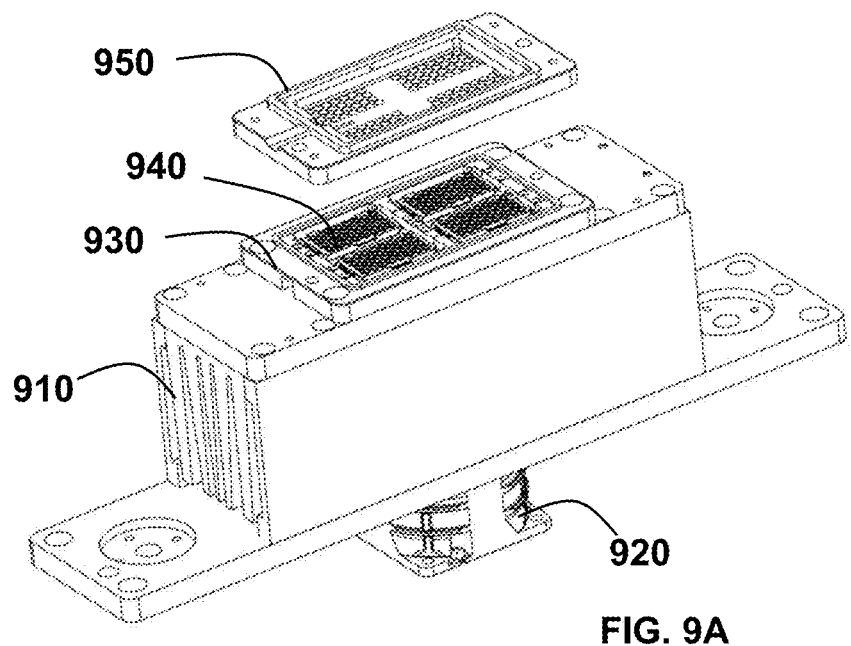
FIG. 9A shows a first embodiment of a single PCR reactor.
Figure 9B:
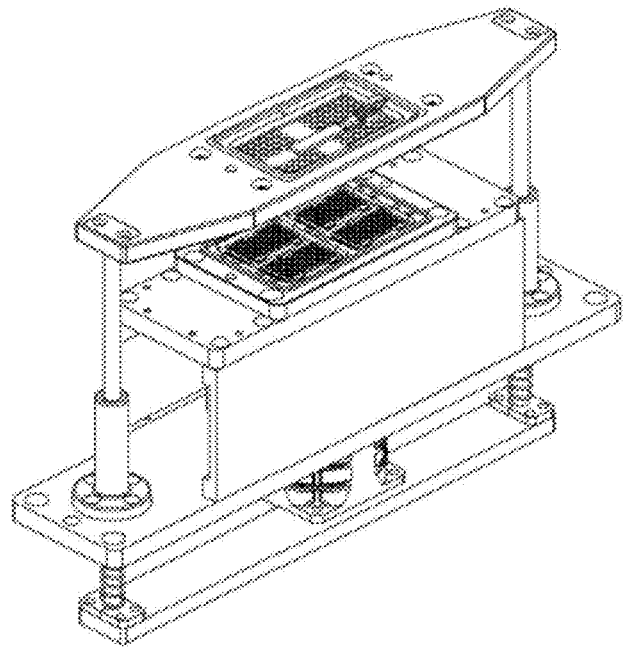
FIG. 9B shows a second embodiment of a single PCR reactor.

FIG. 8 shows the heat lid that sits on the top of the microchip. The heat lit has an array of apertures which are aligned with the top surface of the wells in the microchips. FIG. 9A shows one embodiment of the present PCR units. The PCR comprises of a radiator 910, that can get cooled by a radiator cooling fan 920. A thermal module 930, set on the top of the radiator to hold the microchips 940. A heat lid 950 is set on top of the microchips 940. In this embodiment, one PCR unit holds four microchips which are set in the thermal module. The units are designed to heat and cool the samples to precise temperatures to promote nucleotide denaturation, annealing, and then polymerase-mediated extension for each round of DNA amplification. In one embodiment a Peltier thermal cycler is used. It uses a solid-state active heat pump that transfers heat from one side to the other against a temperature gradient with the consumption of electrical energy. One very useful feature of Peltier blocks is that a thermal gradient can be established, permitting optimization of an assay's annealing step in a single run. FIG. 9B is another embodiment of the present PCR reactor. The heat lid 950 is set on the thermal unit 930 and over the microchips 940. The heat lid has openings to let the fluorescent light pass through. Determining the optimal temperature for primer annealing is crucial for efficient and specific amplification of product. The present PCR system can be programmed to have any desired temperature gradient across each reactor.

The microchips can have different sets of rows and columns of wells. In one embodiment in the present system each microarray has a 4×8 array of wells (sample holders). Each well may have different volumes, ranging from 1 to 125 μl. Any other format with smaller or larger volumes can be used. In one embodiment of the present PCR, each unit has four microchips, each having 32 wells for a total of 128 wells, where annealing, polymerization, or denaturation temperatures are tested in a single run. The thermal gradients can be adjusted to optimize reaction condition in a single run, identifying the best annealing temperature for multiple primer sets, perform reaction that require different annealing temperature at the same time, and more. Therefore, each picture taken from each PCR reactor contains 128 images of each well. Having all images of wells in one picture makes the image analysis and comparison much easier than the prior art. A fluorescent reporter, such as a DNA-binding dye or labeled probe, allows the measurement of the fluorescence intensity of each PCR reaction, and therefore, enables determination of the presence of a target of interest within an experimental sample.

Figure 10:
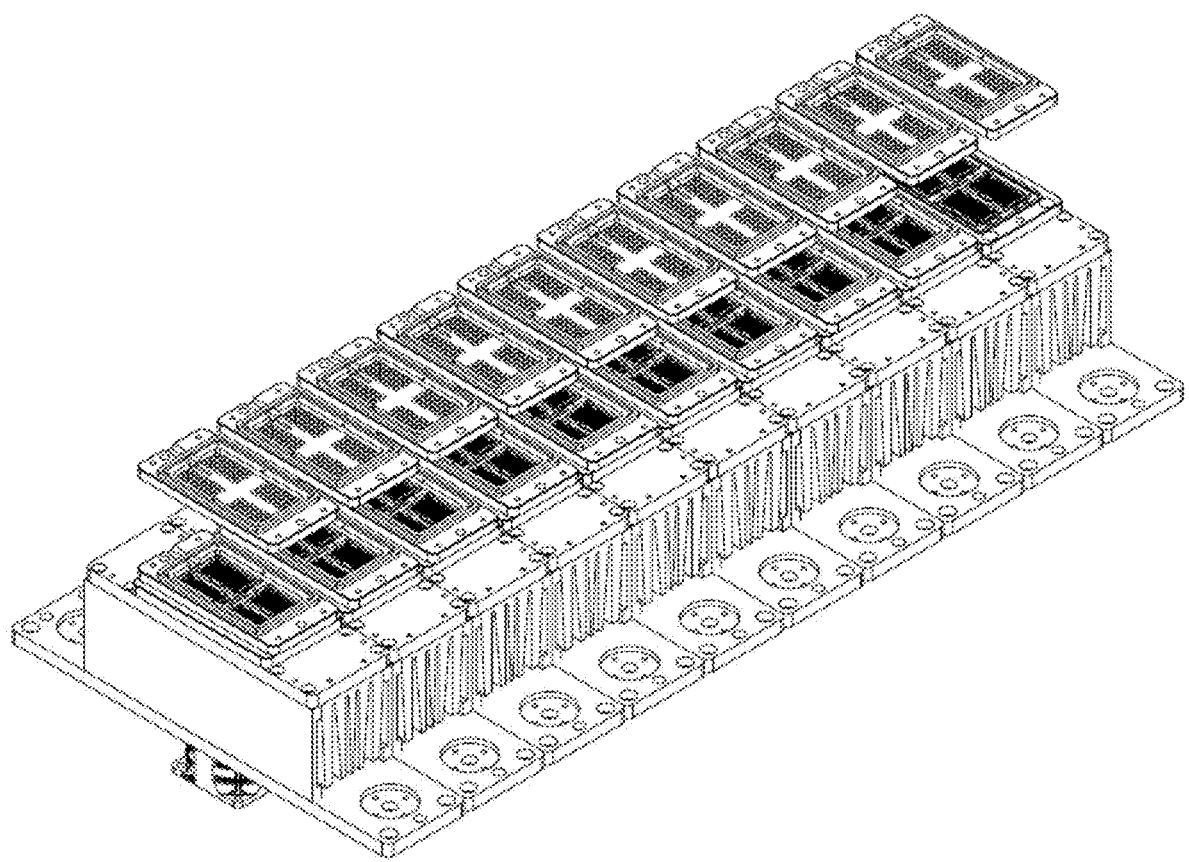
FIG. 10 shows a linear array of ten PCR reactors.

FIG. 10 shows the present automated random-access PCR reactor system, which comprises of 10 PCR reactors that are linearly aligned. Each unit has its own thermal controller, however, the start time of each unit is controlled independently.

Figure 11:
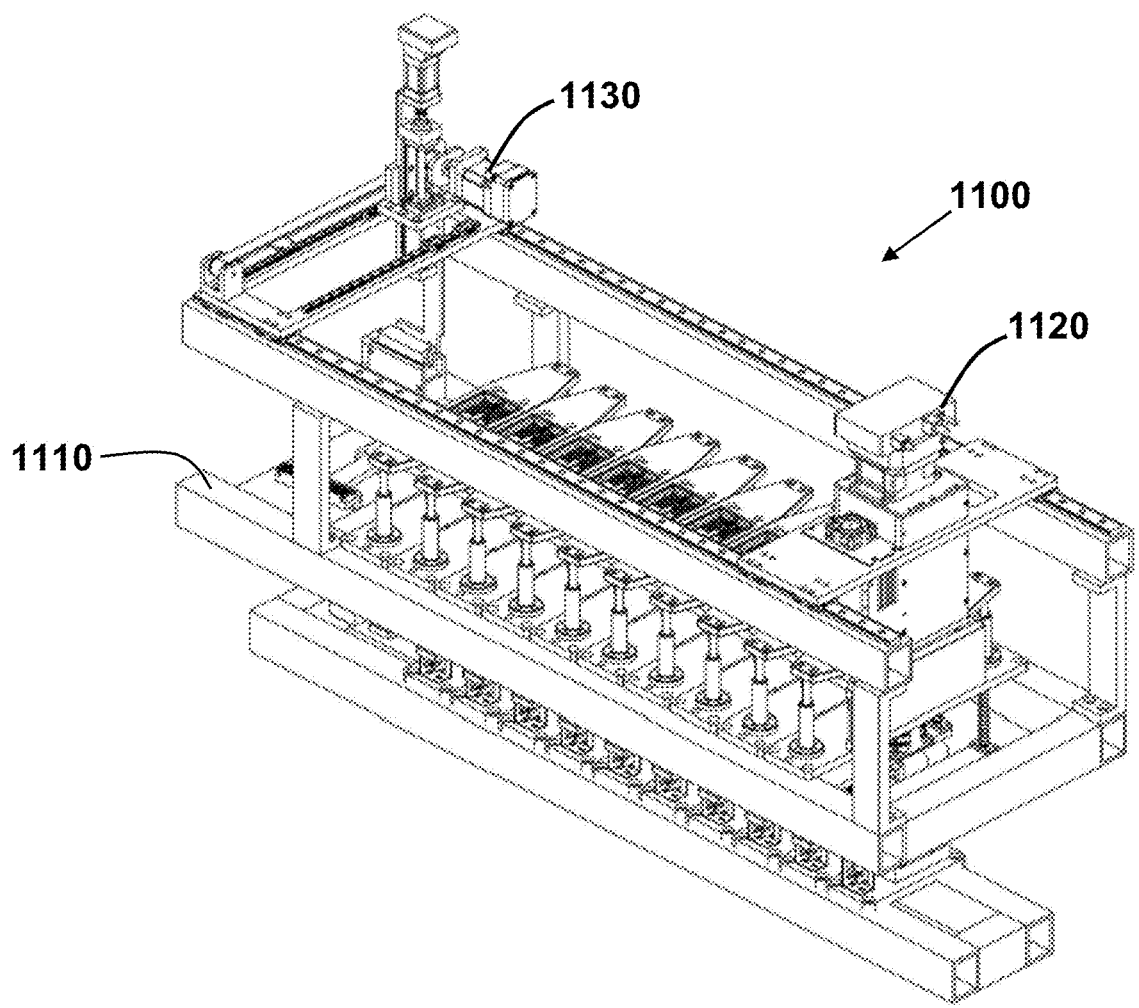
FIG. 11 shows an automated random access PCR system of the present invention.

FIG. 11 shows one embodiment of the complete PCR reactor of the present system 1100. This system has 10 independent PCR units on a platform 1110. The optical system 1120 is installed on a travers system 1130. The traverse system moves the optical system over anyone of the PCR reactors that are ready for imaging. Meanwhile the microchips microchip in any one of other PCR reactors can be replaced with a new set of microchips containing new samples. In the present system, the PCR reactors are aligned linearly and therefore, a linear traverse is used. However, the system can be designed to have any types of PCR arrangement, such as in set of rows and columns, and a two or three dimensional traverse can be programed to move the same optical system over any desired PCR reactor in the system.

The computer sets the thermal cycle parameters for each PCR reactor, and controls the motorized traverse system to move the optics, control the detection unit to take pictures and store data acquired from the detection camera. The PCR of each unit has a different start time, thermal cycling temperatures, and heating times. The movements of the optical system and imaging are set to match to that of each reactor. For example, it may take few seconds to complete illumination and imaging of the fluorescence emission from one PCR, and then the traverse moves the optics over another PCR that is ready for illumination and imaging, and so on. The PCR reactors that have completed operation are replaced with new microchips and set for testing. This allows for a random-access PCR.

The computing unit comprises system controls heaters, the traverse system, camera, and switches. The heater control system controls the heaters, cooling fans, and corresponding sensors. The thermal cycling parameters of each temperature control element can be individually set and configured in the software before start of any program. The motor can be programmed to move the detection unit to the position of the desired reactor for picture-taking at any pre-defined time points. The start of a PCR program for each mini-reactor does not need to be the same. In order to take a picture at the same time point of the thermal cycle of each mini-reactor, it is preferable to start the PCR thermal cycle with a sequential delay. Configuration for the camera is provided in the software for defining parameters such as picture-taking time, exposure time, camera gain, region of interest, and framerate etc. The configuration of emission filter wheels is provided for selecting the desired combination of emission filters to obtain good quality images.

The software also provides a full suite of tools for image processing and data analysis. Many methods can be implemented in the software to calibrate the full-field images and reduce imaging noises, including, but not limited to, flat field calibration, chromatic filter calibration, dark field subtraction, median averaging of multiples images, background subtraction, etc.

The present optical system can be used in many instruments other than PCR and qPCR, such as in fluorescent microscopes, flow cytometry instruments and lab-on-chip devices used in drug discovery and other life sciences research. Also, in any system that a consistent, reproducible, robust, and uniform light distributed over a measurement area is needed.

The analyte sample can be part of a reaction involving species including biopolymers such as, oligonucleotides (DNA, RNA iRNA, siRNA), proteins (including antibodies, enzymes, agonists, antigens, hormones, toxins), oligosaccharides and non polymeric species such as steroids, lipids, phospholipids, Small organic signaling molecules (e.g., retinoic acid), pesticides and non peptidic toxins, hormones and antigens. The luminescence light (fluorescence or phosphorescence) emitted from all of the samples, due to the interaction of light with a chemical species located within the sample containing solution, are then recorded on a camera or a similar system. The recorded images contain images from all of the well on the microarray chip, making the system compact, easy to use, and inexpensive. The optical system can be used in many other light based detection systems such as droplet digital PCR. The wells may contain biological samples such as an oligonucleotide, a DNA molecule, an RNA molecule, a chromosome, or a protein molecule. The present illumination system can be used with a variety of bioanalytical tools such as microtiter plate readers; DNA sequencers; PCR instruments; q-PCR instruments; microscopes; flow cytometry instruments; lab-on-a-chip devices; diagnostic medical devices; and therapeutic medical devices.

The optical system of the present device provides sensitive detection for precise quantification and target discrimination. Scanning just above the sample plate, the device shuttles individually illuminates and detects fluorescence from each well with high sensitivity and no cross talk. The optical system automatically collects data from all wells during data acquisition, so you can enter or edit well information on your own schedule.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

With respect to the above description, it is to be realized that the optimum relationships for the parts of the invention in regard to size, shape, form, materials, function and manner of operation, assembly and use are deemed readily apparent and obvious to those skilled in the art, and all equivalent relationships to those illustrated in the drawings and described in the specification are intended to be encompassed by the present invention.

What is claimed is:

1. A random access PCR reactor system for biological analysis, comprising:
   a) a plurality of PCR reactors, each PCR reactor comprising of a plurality of microchips configured to receive a plurality of biological samples in a plurality of sample holders or wells, a thermal cycler with a temperature control element to control the temperature of the plurality of biological samples;
   b) an optical system comprising of an illumination system and an imaging system to receive and record a plurality of emitted light from each biological sample, wherein the illumination system comprising:
      i) an array of lightpipes to divide a light from a light source into an array of light rays, wherein each lightpipe has an exit surface;
      ii) a lightguide to receive and redirect each light ray along a top surface of the plurality of the microchips, wherein the lightguide has an entrance surface configured to be in contact with the exit surface of each of the lightpipes;
      iii) an array of light reflecting structures configures configured in the lightguide to reflect part of each light ray into each biological sample in each sample holder, wherein all of the plurality of biological samples are illuminated simultaneously to cause emission of the plurality of emitted lights;
   c) a traverse system to hold the optical system, wherein the imaging system is set on the traverse system to be exposed to the top surface of the plurality of microchips to receive the plurality of emitted lights from the plurality of biological samples, and the traverse system is programmed to move the optical system precisely over each PCR reaction at a pre-defined time intervals to take images of the plurality of emitted lights, and d) a computer system to coordinate a thermal cycle timing of each reactor, the movement of the traverse system, and an image capture of the plurality of emitted lights, whereby the random-access PCR reactor can perform multiple PCR tests and allows changing and replacing each PCR reactor randomly and at any desired time while the optical system is on top of another PCR reactor.

2. The PCR reactor system of claim 1, wherein the traverse system is a two dimensional travers, moving the optical system in a planar motion over a plurality of rows of stationary PCR reactors.

3. The system of claim 1, wherein each lightpipe comprises of an array of light transparent material with rectangular cross-sections to guide the light towards the lightguide with low loss, and to manage the light output percentage and angle on each exit surface of each lightpipe to control uniformity and other illumination requirements.

4. The system of claim 1, wherein each lightpipe has substantially a trapezoidal cross-sectional shape having a short side and a long side and a thickness, and wherein the short side of each trapezoidal shape is exposed to the light source and the long side configured to attach to the lightpipe and direct the light ray into a section of the lightpipe.

5. The system of claim 1, wherein the lightguide is substantially rectangular having a top surface, a bottom surface, and a thickness, wherein the array of light reflecting structures are on the top surface or on the bottom surface or on both top and bottom surfaces, and wherein the array of light reflecting lights on the bottom surface are positions to allow the emitted light to pass through the lightguide, and wherein the lightguide has a reflective coating or a material for total internal reflection with uncoated areas at predefined locations to allow for the emitted light to pass through.

6. The system of claim 1, wherein each light reflecting structure is a notch or a cutaway section on the lightguide and each notch has a height and is positioned to reflect light into a row of wells.

7. The system of claim 1, wherein the light reflecting structures are triangular structures to reflect the light back into the light guide, preventing the loss of light and generating a more uniform and diffused light source for each PCR reactor.

8. The system of claim 1, wherein the light reflecting structures are on the top surface and have a right triangular cross section with 45 degree angle, wherein the hypotenuses of each right triangular cross-section is towards an incoming light from the entrance surface of the lightguide.

9. The system of claim 1, wherein the light reflecting structures are on the bottom surface and have a right triangular cross section with a 41 degree angle with respect to the bottom surface and their hypotenuses being towards the incoming light from the entrance surface of the lightguide.

10. The system of claim 1, wherein the top surface has 20 light reflecting structures, wherein the first 8 structures have a height of 0.4 mm, the next 4 structures have a height of 0.18 mm, and the next 4 structures have a height of 0.08 mm, and the last 4 structures have a height of 0.06 mm.

11. The system of claim 1, wherein the bottom surface has 9 light reflecting structures, each having a height of 0.4 mm with 4 mm spacings.

12. The system of claim 1, wherein each lightpipe is moulded into a single piece, or is made of several transparent material pieces combined together to divide the light, and wherein the transparent material is an optical glass, PMMA, poly(acrylic acid), polycarbonate, polyethylene or other optically transparent materials.

13. The system of claim 1, wherein the light source comprises of a light emitting diode (LED) or an array of LEDs or a halogen lamp or a mercury lamp or a laser.

14. The system of claim 1, wherein the light source producing light having wavelengths over a visible light, or UV, or IR, or from 450 nanometers to 700 nanometers, wherein the light source is used to enable excitation and emission wavelength of a fluorescent dye mixed with each biological sample.

15. The system of claim 1, further comprises an emission filter positioned between the imaging sensor and the microarray reaction chip and configured to allow light signals of only a selected wavelength to reach the sensor and to filter the spectral content of the light to a desired wavelength.

16. The system of claim 1, wherein the system is configured to receive and produce the plurality of discrete sample images for each of wells having a volume of 1 to 100 microliters.

17. The system of claim 1, wherein the light source is configured to produce an excitation beam that causes a substantially uniform excitation within an area ranging from about 0.1 $cm^2$ to about 1000 $cm^2$.

18. The PCR reactor system of claim 1, further comprising a plate with a plurality of windows configured to sit on the top of the microchip to allow for a desired wavelength go light to pass through each window.

19. An optical system comprising of an illumination system and an imaging system to receive and record a plurality of emitted lights from an array of biological samples held in a plurality of microchips and having an exposed surface, wherein the illumination system comprising:
  i) an array of lightpipes to divide a light from a light source into an array of light rays, wherein each lightpipe has an exit surface;
  ii) a lightguide to receive and redirect each light ray along the exposed surface of the plurality of the microchips, wherein the lightguide has an entrance surface configured to be in contact with the exit surface of each of the lightpipes;
  iii) an array of light reflecting structures configures configured in the lightguide to reflect part of each light ray into each biological sample in each sample holder, wherein all of the plurality of biological samples are illuminated simultaneously to cause emission of the plurality of emitted lights, and wherein the imaging system is located above the exposed surface to receive and record the emitted light from the array of biological samples.

20. The system of claim 19, wherein imaging system comprises a set of optical lenses between the imaging sensor and the microarray reaction chip to image the whole surface of the chip and to filter the spectral content of the light to a desired wavelength.

* * * * *